United States Patent
Hufker et al.

(10) Patent No.: US 11,432,151 B1
(45) Date of Patent: Aug. 30, 2022

(54) WIRELESS GATEWAY WITH MULTIPLE PROCESSORS MANAGED BY TRUSTED PROCESSOR

(71) Applicant: T-MOBILE INNOVATIONS LLC, Overland Park, KS (US)

(72) Inventors: David Hufker, Shawnee, KS (US); Lyle W. Paczkowski, Mission Hills, KS (US); George J. Schnellbacher, Overland Park, KS (US); Michael D. Svoren, Jr., Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 537 days.

(21) Appl. No.: 16/570,857

(22) Filed: Sep. 13, 2019

(51) Int. Cl.
*H04W 12/08* (2021.01)
*H04W 84/04* (2009.01)
*H04W 88/16* (2009.01)

(52) U.S. Cl.
CPC .......... *H04W 12/08* (2013.01); *H04W 84/042* (2013.01); *H04W 88/16* (2013.01)

(58) Field of Classification Search
CPC .... H04W 88/16; H04W 84/042; H04W 12/08
USPC .......................................................... 726/3
See application file for complete search history.

(56) References Cited

U.S. PATENT DOCUMENTS

| | | | |
|---|---|---|---|
| 9,282,898 B2 | 3/2016 | McRoberts et al. | |
| 9,495,548 B2* | 11/2016 | Bousquet | G06F 21/606 |
| 10,499,249 B1* | 12/2019 | Marquardt | H04L 63/0428 |
| 2014/0150093 A1* | 5/2014 | Bousquet | H04W 4/60 726/21 |
| 2016/0036826 A1* | 2/2016 | Pogorelik | H04L 63/20 726/1 |

* cited by examiner

*Primary Examiner* — Josnel Jeudy (57) ABSTRACT

A method of communicating using a wireless gateway. The method comprises receiving a first message in a first radio spectrum band by a first radio transceiver of a wireless gateway, determining by a first processor of the wireless gateway that the first message is a trusted message transmitted by a first source device, transmitting the first message by the first radio transceiver in the first radio spectrum, receiving a second message in a second radio spectrum band by a second radio transceiver of the wireless gateway, determining by the first processor that the second message is a trusted message transmitted by a second source device, and transmitting a third message by the second radio transceiver in the second radio spectrum band to the second source device, wherein the third message directs the second source device to transmit the second message to the wireless gateway in the first radio spectrum band.

19 Claims, 4 Drawing Sheets

WIRELESS GATEWAY WITH MULTIPLE PROCESSORS MANAGED BY TRUSTED PROCESSOR

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication technology continues to be an active area of technology development and advancement. Cellular wireless coverage is nearly ubiquitous in the United States, and wireless communication subscribers now are surprised and disappointed when they do not have continuous access to wireless communication for both voice and data. New fields of wireless communication innovation include providing wireless communication service to Internet of Things (IoT) devices into the wireless communication network and providing the fifth generation (5G) of cellular communications. New challenges will be presented by the desire to provide flexible data access speeds at a range of different price points while preserving the security of the wireless network infrastructure.

SUMMARY

In an embodiment, a wireless gateway is disclosed. The wireless gateway comprises a first radio transceiver configured to communicate wirelessly in a first radio spectrum band, a second radio transceiver configured to communicate wirelessly in a second radio spectrum band, and a third radio transceiver configured to communicate wirelessly in a third radio spectrum band. The wireless gateway further comprises a non-transitory memory, a first processor coupled to the non-transitory memory, to the first radio transceiver, and to the second radio transceiver where the first processor provides a trusted execution environment (TEE) and no rich execution environment (REE), a second processor coupled to the second radio transceiver that provides a REE that processes untrusted messages received via the second radio transceiver and transmits untrusted messages via the second radio transceiver, and a third processor coupled to the third radio transceiver that provides a REE that processes untrusted messages received via the third radio transceiver and transmits untrusted messages via the third radio transceiver. The wireless gateway further comprises an application stored in the non-transitory memory that, when executed by the first processor, monitors messages received by the second radio transceiver, determines that a first trusted communication message has been received by the second radio transceiver, blocks access of the second processor to the first trusted communication message, transmits a first message via the second radio transceiver to a first source of the first trusted communication message directing the first source to send the first trusted communication message to the wireless gateway in the first radio spectrum band, and discards the first trusted communication message without transmitting it. The application further monitors messages received by the third radio transceiver, determines that a second trusted communication message has been received by the second radio transceiver, blocks access of the second processor to the second trusted communication message, transmits a second message via the third radio transceiver to a second source of the second trusted communication message directing the second source to send the second trusted communication message to the wireless gateway in the first radio spectrum band, and discards the second trusted communication message without transmitting it.

In another embodiment, a method of communicating using a wireless gateway is disclosed. The method comprises receiving a first message in a first radio spectrum band by a first radio transceiver of a wireless gateway, determining by a first processor of the wireless gateway that the first message is a trusted message transmitted by a first source device and addressed to a first destination device, wherein the first processor provides a trusted execution environment (TEE) and no rich execution environment (REE), and transmitting the first message by the first radio transceiver in the first radio spectrum, whereby the first message is routed to the first destination device. The method further comprises receiving a second message in a second radio spectrum band by a second radio transceiver of the wireless gateway, determining by the first processor that the second message is a trusted message transmitted by a second source device and addressed to a second destination device, transmitting a third message by the second radio transceiver in the second radio spectrum band to the second source device, wherein the third message directs the second source device to transmit the second message to the wireless gateway in the first radio spectrum band, and discarding the second message by the first processor without transmitting it by either the first radio transceiver or the second radio transceiver.

In yet another embodiment, a wireless gateway is disclosed. The wireless gateway comprises a first radio transceiver configured to communicate wirelessly in a first radio spectrum band, a second radio transceiver configured to communicate wirelessly in a second radio spectrum band, a non-transitory memory, a first processor coupled to the non-transitory memory, to the first radio transceiver, and to the second radio transceiver where the first processor provides a trusted execution environment (TEE) and no rich execution environment (REE), a second processor coupled to the second radio transceiver that provides a REE, and an application stored in the non-transitory memory. When executed by the first processor, the application monitors messages received by the second radio transceiver, determines that a trusted communication message has been received by the second radio transceiver, blocks access of the second processor to the trusted communication message, and transmits a message via the second radio transceiver to the source of the trusted communication message directing the source to send the trusted communication message to the wireless gateway in the first radio spectrum band.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a private wireless gateway with a plurality of processors, where one of the processors, referred to as a trusted processor, is configured to operate only in a trusted execution environment (TEE) mode of operation. The remaining processors of the private wireless gateway (one or more additional processors) are configured to operate in a rich execution environment (REE) of that processor and optionally to operate in a TEE of that processor in some transient operation scenarios. The TEE of a processor may be supported by hardware features that prevents other processors executing in their REEs from accessing any communication buses of the private wireless gateway while the processor of the TEE is executing in its trusted operation mode, for example restricting access of other processors executing in their REEs to one or more of a memory of the gateway, a user interface of the gateway, a radio transceiver of the gateway, and a data communication interface of the gateway. In an embodiment, the trusted processor may access the communication buses while one of the remaining processors is executing in its TEE. A hardware feature of a processor that promotes execution in the TEE may be referred to as a trusted security zone (TSZ). TEEs and TSZs are discussed further hereinafter.

The private wireless gateway comprises a plurality of radio transceivers, where each radio transceiver is configured to transmit and receive in a different radio frequency band or radio spectrum band. For example, a first radio transceiver may be configured to transmit and receive in the 900 MHz radio spectrum band, a second radio transceiver may be configured to transmit and receive in the 1900 MHz radio spectrum band, a third radio transceiver may be configured to transmit and receive in the 3500 MHz radio spectrum band, a fourth radio transceiver may be configured to transmit and receive in a 28 GHz radio spectrum band, and a fifth radio transceiver may be configured to transmit and receive in a 38 GHz radio spectrum band. It is understood that some private wireless gateways may comprise two or three different radio transceivers.

Each of the different radio transceivers is configured to transmit and receive in a different radio spectrum band. Each of the radio transceivers may comprise a modem component that couples the radio transceiver to baseband communication processing portions of the private wireless gateway, for example to the communication buses of the private wireless gateway. Some of the different radio transceivers may employ different modulate-demodulate algorithms, because different radio spectrum bands may be associated with different modulation-demodulation techniques. It is understood that a radio spectrum band comprises more than a single frequency that is used to name the spectrum band (e.g., "the 1900 MHz spectrum band") but additionally a range of frequency both below and above the frequency used to name the spectrum band. It is also understood that the radio transmitting and receiving components of a radio transceiver are tuned to the radio spectrum band the radio transceiver is configured for and may be poorly suited for use in a different radio spectrum band (e.g., may be inefficient and/or noisy in the sense of generating unwanted and possibly forbidden spurious radio emissions).

In an embodiment, one of the radio transceivers of the private wireless gateway is assigned to and reserved solely for use by the trusted processor that executes solely in the TEE. The other processor or processors of the private wireless gateway are not configured to have any access to the reserved radio transceiver. The reserved radio transceiver may be used for transmitting trusted messages, for example trusted messages transmitting a trusted end-to-end communication channel or communication link. It is a condition of transmitting trusted messages that they be transmitted from a message source processor executing in its TSZ to a message destination processor executing in its TSZ and transmits only other processors executing in their TSZs in the communication channel between the source and destination processors. This condition for trusted communication applies to processors that are processing the transmitting messages at the IP layer or higher in the communication stack (e.g., this condition does not apply to network hubs and bridges).

The trusted processor may monitor the communication of the other radio transceivers to detect if any trusted messages happen to be received by them. In the case a trusted message is received by another radio transceiver (e.g., a radio transceiver that is not reserved for use by the trusted processor) of the private wireless gateway, the trusted processor prevents the other processor executing in its REE from receiving the trusted message and also transmits a message back to the source of the trusted message indicating that the source ought to redirect the trusted message to the trusted processor via the radio spectrum band associated with the radio transceiver reserved for use by the trusted processor. In this way, the trusted processor may promote preserving the expectation of trust when transmitting trusted messages.

In an embodiment, some of the processors of the private wireless gateway may be configured to execute both in a REE and in a TEE. The trusted processor may receive a trusted message requesting to send a trusted message in a different radio spectrum band to a different one of the radio transceivers of the private wireless gateway. The trusted processor may then command the processor associated with the different radio spectrum band to commence executing in its TEE. The trusted processor may then transmit a message to the source requesting it to transmit a trusted message on the different radio spectrum indicating that the private wireless gateway is configured to receive the trusted message on the different radio spectrum. When the processor associated with the different radio spectrum band has completed participating in the trusted end-to-end communication link, the processor may first signal to the trusted processor that it is returning to execution in the REE, and then it may transition out of executing in its TEE and return to processing in its REE. In an embodiment, only one of the other processors (processors excluding the trusted processor) may execute in its TEE at a time. It is noted that the trusted processor always executes in its TEE because it does not have a REE—it has only a trusted security zone.

In an embodiment, the trusted processor of the private wireless gateway manages channel bonding involving two or more different radio transceivers and two or more different processors associated with the radio transceivers. Channel bonding refers to providing a single logical communication channel that is physically implemented by a plurality of different physical channels. For example, a 10 MHz bonded channel may be provided by logically combining a 5 MHz channel in a 1900 MHz radio spectrum band with a 5 MHz channel in a 28 GHz radio spectrum band. In this way the private wireless gateway may provide a 10 MHz channel downstream to a user equipment (UE) such as a laptop computer based on using two 5 MHz channels upstream on different radio spectrum bands. The trusted processor can manage the interleaving of the data frames or subframes of the two physical channels to produce the single bonded channel down to the UE.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-End Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Figure 1:
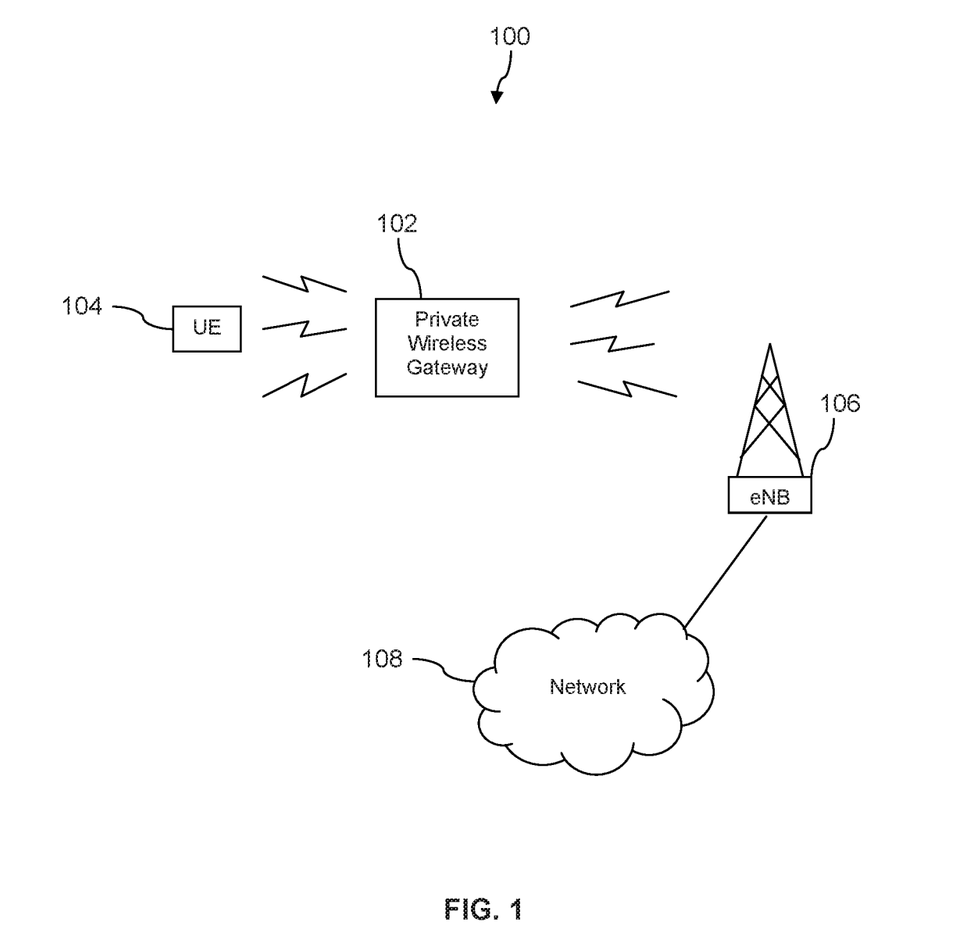
- FIG. 1 is a block diagram of a communication system according to an embodiment of the disclosure.

Tuning now to FIG. 1, a communication system 100 is described. In an embodiment, the system 100 comprises a private wireless gateway 102, a user equipment (UE) 104, a cell site 106, and a network 108. The network 108 comprises one or more private networks, one or more public networks, or a combination thereof. The private wireless gateway 102 wirelessly couples the UE 104 to the cell site 106, and the cell site 106 couples the UE 104 to the network 108, whereby the UE 104 is provided with communications connectivity to other UEs, web servers/web applications, and other communication services. While a single private wireless gateway 102, a single UE 104, and a single cell site 106 are illustrated in FIG. 1, it is understood that the system 100 may comprise any number of private wireless gateways 102, any number of UEs 104, and any number of cell sites 106.

In an embodiment, the private wireless gateway 102 provides UE relay services for the UE 104. For example, the UE 104 may be located inside a building that blocks the radio signal of the cell site 106 from reaching the UE 104 and that blocks the radio signal of the UE 104 from reaching the cell site 106. The private wireless gateway 102 can be positioned near an outer wall of the building such that it is not blocked from transmitting and receiving radio signals to or from the cell site 106. Alternatively, a plurality of private wireless gateways 102 may be positioned so that a first private wireless gateway 102 relays UE 104 communications to/from a second private wireless gateway 102, and the second private wireless gateway 102 has radio communication with the cell site 106. The private wireless gateway 102 may communicate with the cell site 106 by one or more of a 5G, a long term evolution (LTE), a code division multiple access (CDMA), or a global system for mobile communication (GSM) radio communication protocol.

In an embodiment the UE 104 may be any of a mobile phone, a smart phone, a personal digital assistant (PDA), a wearable computer, a headset computer, a laptop computer, a notebook computer, a tablet computer, or a desktop computer. In an embodiment, the UE 104 may be an Internet of things (IoT) device. The private wireless gateway 102 may communicate with the UE 104 on two or more radio spectrum bands at the same time, for example to provide increased data throughput to the UE 104. The private wireless gateway 102 may communicate with the cell site 106 on two or more radio spectrum bands at the same time. In an embodiment, at least one of the radio spectrum bands that the private wireless gateway 102 uses to communicate with the UE 104 is different from the radio spectrum bands used by the private wireless gateway 102 to communicate with the cell site 106. For example, the private wireless gateway 102 may transmit to and receive from the UE 104 on a first radio spectrum band and on a second radio spectrum band and transmit to and receive from the cell site 106 on a third radio spectrum band and a fourth radio spectrum band. In a different example, the private wireless gateway 102 may transmit to and receive from the UE 104 on the first radio spectrum band and the second radio spectrum band and transmit to and receive from the cell site 106 on the first radio spectrum band and the third radio spectrum band. In a different example, the private wireless gateway 102 may transmit to and receive from the UE 104 on the first radio spectrum band and the second radio spectrum band and transmit to and receive from the cell site 106 on the third radio spectrum band, on the fourth radio spectrum band, and on a fifth radio spectrum band. Yet other combinations of radio spectrum band linkages between the private wireless gateway 102 and the UE 104 and between the private wireless gateway 102 and the cell site 106 are contemplated by the present disclosure.

Figure 2:
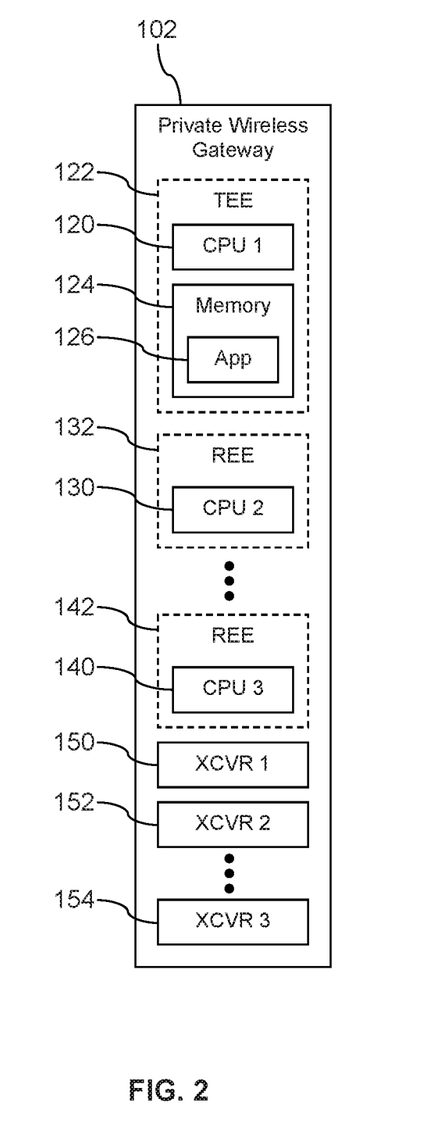
FIG. 2 is a block diagram of a private wireless gateway according to an embodiment of the disclosure.

Turning now to FIG. 2, further details of the private wireless gateway 102 are described. In an embodiment, the private wireless gateway 102 comprises a trusted execution environment (TEE) 122 that comprises a first processor 120 and a first memory 124. In an embodiment, the first memory 124 stores an application 126. The private wireless gateway 102 further comprises a first rich execution environment (REE) 132 that comprises a second processor 130. In an embodiment, the private wireless gateway 102 may comprise additional REEs 132, for example a second REE 142 comprising a third processor 140. The private wireless gateway 102 further comprises a plurality of radio transceivers, for example a first radio transceiver 150, a second radio transceiver 152, and a third radio transceiver 154. In an embodiment, the TEE 122 is associated with the first radio transceiver 150, the first REE 132 is associated with the second radio transceiver 152, and the second REE 142 is associated with the third radio transceiver 154.

The first radio transceiver 150 is configured to transmit and receive in a first radio spectrum band, the second radio transceiver 152 is configured to transmit and receive in a second radio spectrum band that is different from the first radio spectrum band, and the third radio transceiver 154 is configured to transmit and receive in a third radio spectrum band that is different from both the first radio spectrum band and the second radio spectrum band. In an embodiment, the first radio transceiver 150 is accessible only to the first processor 120 and is inaccessible to the second processor 130 and the third processor 140. In an embodiment, each of the radio transceivers 150, 152, 154 comprises a modem that couples the radio transceiver to baseband communication processing portions of the private wireless gateway 102.

The first processor 120 may execute the application 126 to manage trusted communications activities of the private wireless gateway 102. The application 126 may manage the role of the first radio transceiver 150 in relaying trusted messages in a trusted end-to-end communication link. The application 126 may transmit trusted messages originated by the first processor 120 via the first radio transceiver 150 and may receive trusted messages addressed to the first processor 120 via the first radio transceiver 150.

In an embodiment, the first processor 120 executes only in the TEE 122. Said in other words, in an embodiment, the first processor 120 comprises a TSZ and no non-TSZ portion. In some contexts, the first processor 120 may be referred to as a trusted processor. In an embodiment, the first memory 124 is accessible to the first processor 120 and is inaccessible to other processors 130, 140 of the private wireless gateway 102. In some contexts, the first memory 124 may be referred to as trusted memory.

The application 126 may monitor communication messages received by the second radio transceiver 152 and the third radio transceiver 154 to determine if any trusted communication messages are received by those radio transceivers 152, 154. The application 126 may determine if a message received is a trusted communication message by examining a header of the message. For example, the header that is examined may be a transmission control protocol (TCP) header or a universal datagram protocol (UDP) header that comprises a port number that indicates a trusted message. The trusted status of the communication message may be indicated in another way that may be analyzed by the application 126.

When the application 126 determines that a trusted message has been received by the second radio transceiver 152 or by the third radio transceiver 154, it may prevent the propagation of the received message to the second processor 130 or the third processor 140. The application 126 may further generate a message and transmit the message via the radio transceivers 152, 154 to the source of the trusted message, where the message it transmits instructs the source to send the trusted message instead in the radio spectrum band associated with the first radio transceiver 150. In this way, the application 126 can assure that trusted communications are not received by processors 130, 140 that are not executing in trust when the message is initially received.

Alternatively, in an embodiment, when the application 126 determines that a trusted message has been received by the second radio transceiver 152 or by the third radio transceiver 154, it may temporarily cache the trusted message in the first memory 124, cause the second processor 130 or the third processor 140 to begin executing in its TEE 122, retrieve the trusted message from the first memory 124, and deliver the trusted message to the processors 130, 140 that is now executing in its TEE 122. The application 126 may continue to monitor trusted messages arriving and assuring that the subject processor 130, 140 continues executing in its TEE 122. In an embodiment, only one of the second processor 130 or the third processor 140 are permitted to execute in its TEE 122 at one time. It is noted that the first processor 120 is always executing in its TSZ and in the TEE 122.

Figure 3:
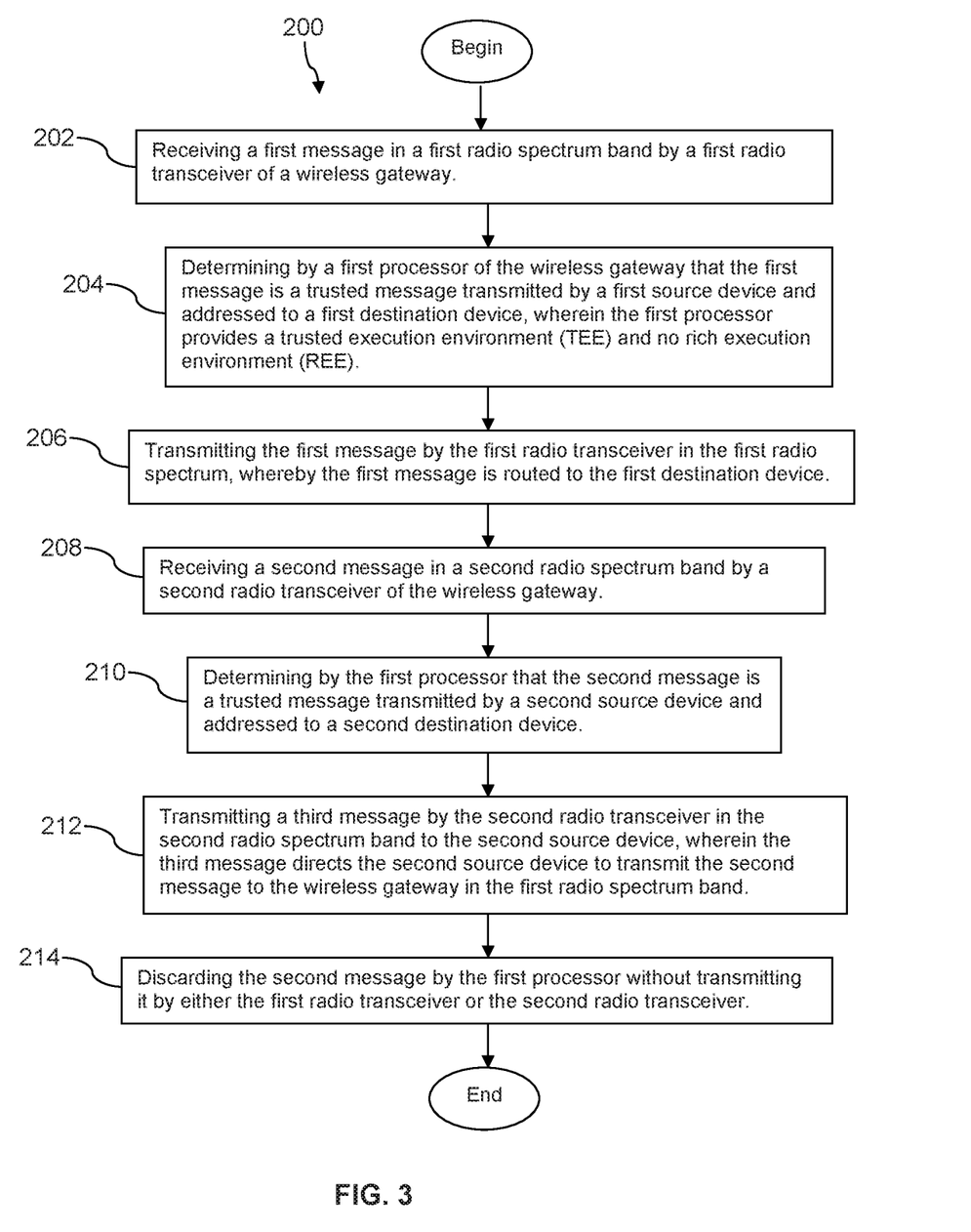
FIG. 3 is a flow chart of a method according to an embodiment of the disclosure.

Turning now to FIG. 3, a method 200 is described. In an embodiment, the method 200 is a method of communicating using a wireless gateway. At block 202, the method 200 comprises receiving a first message in a first radio spectrum band by a first radio transceiver of a wireless gateway. At block 204, the method 200 comprises determining by a first processor of the wireless gateway that the first message is a trusted message transmitted by a first source device and addressed to a first destination device, wherein the first processor provides a trusted execution environment (TEE) and no rich execution environment (REE). Said in other words, the first processor has a trusted security zone (TSZ) and no non-trusted, non-TSZ processing capability. It is understood that the TEE may comprise other non-processor resources such as a memory that is accessible only to the first processor.

At block 206, the method 200 comprises transmitting the first message by the first radio transceiver in the first radio spectrum, whereby the first message is routed to the first destination device. At block 208, the method 200 comprises receiving a second message in a second radio spectrum band by a second radio transceiver of the wireless gateway. At block 210, the method 200 comprises determining by the first processor that the second message is a trusted message transmitted by a second source device and addressed to a second destination device. The processing of block 210 may be performed by an application executing on the first processor, for example performed by the application 126 executing on the first processor 120.

At block 212, the method 200 comprises transmitting a third message by the second radio transceiver in the second radio spectrum band to the second source device, wherein the third message directs the second source device to transmit the second message to the wireless gateway in the first radio spectrum band. In an embodiment, the second radio transceiver transmits the third message under the control of an application executing on the first processor, for example under the command of the application 126 executing on the first processor 120. At block 214, the method 200 comprises discarding the second message by the first processor without transmitting it by either the first radio transceiver or the second radio transceiver. In an embodiment, the processing of block 214 may be provided by an application executing on the first processor, for example performed by the application 126 executing on the first processor 120.

In an embodiment, the method 200 further comprises receiving a fourth message in the second radio spectrum band by the second radio transceiver and storing the fourth message in a non-transitory memory of the wireless gateway by the first processor, wherein the non-transitory memory is part of the TEE of the first processor. The fourth message may be determined by the first processor and/or the application to be a trusted communication message. The method further comprises commanding a second processor of the wireless gateway to execute in a TEE of the second processor, reading the fourth message from the non-transitory memory by the first processor, and propagating the fourth message by the first processor to the second processor after the second processor is executing in its TEE.

Figure 4:
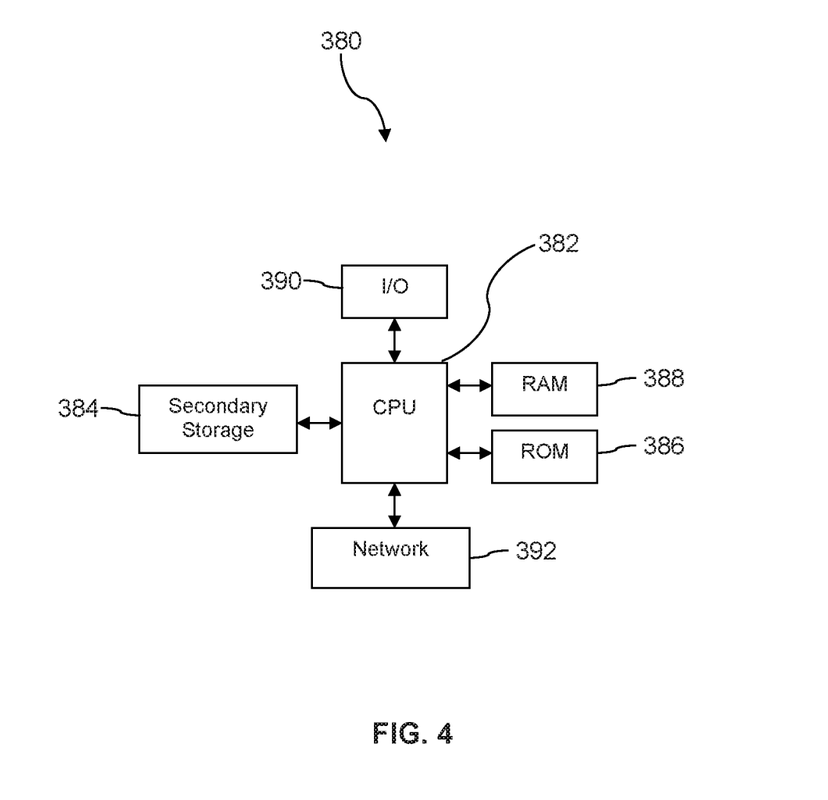
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other devices, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A wireless gateway, comprising:
 a first radio transceiver configured to communicate wirelessly in a first radio spectrum band;
 a second radio transceiver configured to communicate wirelessly in a second radio spectrum band;
 a third radio transceiver configured to communicate wirelessly in a third radio spectrum band;
 a non-transitory memory;
 a first processor coupled to the non-transitory memory, to the first radio transceiver, and to the second radio transceiver where the first processor provides a trusted execution environment (TEE) and no rich execution environment (REE);
 a second processor coupled to the second radio transceiver that provides a REE that processes untrusted messages received via the second radio transceiver and transmits untrusted messages via the second radio transceiver;
 a third processor coupled to the third radio transceiver that provides a REE that processes untrusted messages received via the third radio transceiver and transmits untrusted messages via the third radio transceiver; and
 an application stored in the non-transitory memory that, when executed by the first processor monitors messages received by the second radio transceiver,
  determines that a first trusted communication message has been received by the second radio transceiver, blocks access of the second processor to the first trusted communication message, transmits a first message via the second radio transceiver to a first source of the first trusted communication message directing the first source to send the first trusted communication message to the wireless gateway in the first radio spectrum band, discards the first trusted communication message without transmitting it, monitors messages received by the third radio transceiver, determines that a second trusted communication message has been received by the second radio transceiver, blocks access of the second processor to the second trusted communication message, transmits a second message via the third radio transceiver to a second source of the second trusted communication message directing the second source to send the second trusted communication message to the wireless gateway in the first radio spectrum band, and discards the second trusted communication message without transmitting it.

2. The wireless gateway of claim 1, wherein the first, second, and third spectrum bands are each different from each other and are selected from the group consisting of a 900 MHz radio spectrum band, a 1900 MHz radio spectrum band, a 28 GHz radio spectrum band, and a 38 GHz radio spectrum band.

3. The wireless gateway of claim 1, wherein the first, second, and third radio transceivers communicate wirelessly according to at least one of a 5G, a long term evolution (LTE), a code division multiple access (CDMA), and a global system for mobile communications (GSM) radio communication protocol.

4. The wireless gateway of claim 1, wherein the second processor further provides a TEE and the application further:
determines that a third trusted message is received by the second radio transceiver,
stores the third trusted message in the non-transitory memory,
commands the second processor to start executing in its TEE, and
provides the third trusted message to the second processor for processing in its TEE.

5. The wireless gateway of claim 1, wherein the first processor is configured to determine that the first radio transceiver receives a fourth trusted message that is to be relayed on to another device in a trusted end-to-end communication link and to command the first radio transceiver to transmit the fourth trusted message, whereby the first processor and the first radio transceiver promote sending trusted messages in a trusted end-to-end communication link.

6. The wireless gateway of claim 1, wherein the non-transitory memory is only accessible to the first processor.

7. The wireless gateway of claim 1, wherein the application determines that the second radio transceiver has received the first trusted communication message by determining a protocol port number in a header of the first trusted communication message.

8. A method of communicating using a wireless gateway, comprising:
receiving a first message in a first radio spectrum band by a first radio transceiver of a wireless gateway;
determining by a first processor of the wireless gateway that the first message is a trusted message transmitted by a first source device and addressed to a first destination device, wherein the first processor provides a trusted execution environment (TEE) and no rich execution environment (REE);
transmitting the first message by the first radio transceiver in the first radio spectrum, whereby the first message is routed to the first destination device;
receiving a second message in a second radio spectrum band by a second radio transceiver of the wireless gateway, wherein the second radio transceiver is coupled to a second processor that provides a REE that processes untrusted messages received via the second radio transceiver and transmits untrusted messages via the second radio transceiver;
determining by the first processor that the second message is a trusted message transmitted by a second source device and addressed to a second destination device;
blocking by the first processor access of the second processor to the second message;
transmitting a third message by the second radio transceiver in the second radio spectrum band to the second source device, wherein the third message directs the second source device to transmit the second message to the wireless gateway in the first radio spectrum band; and
discarding the second message by the first processor without transmitting it by either the first radio transceiver or the second radio transceiver.

9. The method of claim 8, wherein the first processor determines that the first message and the second message are trusted messages based on identifying a protocol port number in headings of the messages.

10. The method of claim 8, further comprising:
receiving a fourth message in the second radio spectrum band by the second radio transceiver;
storing the fourth message in a non-transitory memory of the wireless gateway by the first processor, wherein the non-transitory memory is part of the TEE of the first processor;
commanding a second processor of the wireless gateway to execute in a TEE of the second processor;
reading the fourth message from the non-transitory memory by the first processor; and
propagating the fourth message by the first processor to the second processor after the second processor is executing in its TEE.

11. The method of claim 10, wherein the non-transitory memory is only accessible to the first processor.

12. The method of claim 8, wherein the first and second spectrum bands are each different from each other and are selected from the group consisting of a 900 MHz radio spectrum band, a 1900 MHz radio spectrum band, a 28 GHz radio spectrum band, and a 38 GHz radio spectrum band.

13. The method of claim 8, wherein the first, second, and third radio transceivers communicate wirelessly according to at least one of a 5G, a long term evolution (LTE), a code division multiple access (CDMA), and a global system for mobile communications (GSM) radio communication protocol.

14. A wireless gateway, comprising:
a first radio transceiver configured to communicate wirelessly in a first radio spectrum band;
a second radio transceiver configured to communicate wirelessly in a second radio spectrum band;
a non-transitory memory;

a first processor coupled to the non-transitory memory, to the first radio transceiver, and to the second radio transceiver where the first processor provides a trusted execution environment (TEE) and no rich execution environment (REE);

a second processor coupled to the second radio transceiver that provides a REE; and an application stored in the non-transitory memory that, when executed by the first processor:

monitors messages received by the second radio transceiver, determines that a trusted communication message has been received by the second radio transceiver, blocks access of the second processor to the trusted communication message, and transmits a message via the second radio transceiver to a source of the trusted communication message directing the source to send the trusted communication message to the wireless gateway in the first radio spectrum band.

15. The wireless gateway of claim 14, wherein the first radio spectrum band is different from the second radio spectrum band.

16. The wireless gateway of claim 15, wherein the first and second spectrum bands are selected from the group consisting of a 900 MHz radio spectrum band, a 1900 MHz radio spectrum band, a 28 GHz radio spectrum band, and a 38 GHz radio spectrum band.

17. The wireless gateway of claim 14, wherein the second processor further provides a TEE.

18. The wireless gateway of claim 17, wherein the application further:

determines that a second trusted communication message is received by the second radio transceiver, stores the second trusted message in the non-transitory memory, commands the second processor to start executing in its TEE, and provides the second trusted message to the second processor for processing in its TEE.

19. The wireless gateway of claim 14, wherein the non-transitory memory is only accessible to the first processor.

* * * * *